United States Patent [15] 3,665,273
Enslin [45] May 23, 1972

[54] POLYPHASE ALTERNATING CURRENT FREQUENCY VARIATOR FOR INDUCTION AND SYNCHRONOUS TYPE MOTOR

[72] Inventor: Nicholas Charl de Villiers Enslin, 7 Longacres, Sans Souci Road, Newlands, Cape Providence, Republic of South Africa

[22] Filed: Aug. 11, 1969
[21] Appl. No.: 848,944

[30] Foreign Application Priority Data

Aug. 15, 1968 Republic of South Africa......68/5306

[52] U.S. Cl..............................................318/227, 318/231
[51] Int. Cl. .......................................................H02p 5/40
[58] Field of Search ..........................318/227, 230, 231, 187

[56] References Cited

UNITED STATES PATENTS

| | | | |
|---|---|---|---|
| 3,242,408 | 3/1966 | Hetzel | 318/187 |
| 3,320,506 | 5/1967 | Humphrey | 318/227 X |
| 3,365,638 | 1/1968 | Risberg | 318/227 X |
| 3,436,645 | 4/1969 | Johnson et al. | 318/227 X |

Primary Examiner—Gene Z. Rubinson
Attorney—Karl W. Flocks

[57] ABSTRACT

A frequency variator for controlling the speed of polyphase alternating current induction and synchronous type motors. The frequency of the A.C. power supply to the motor is varied by controlling the firing of power control gates in series with the motor windings in an ordered sequence.

4 Claims, 18 Drawing Figures

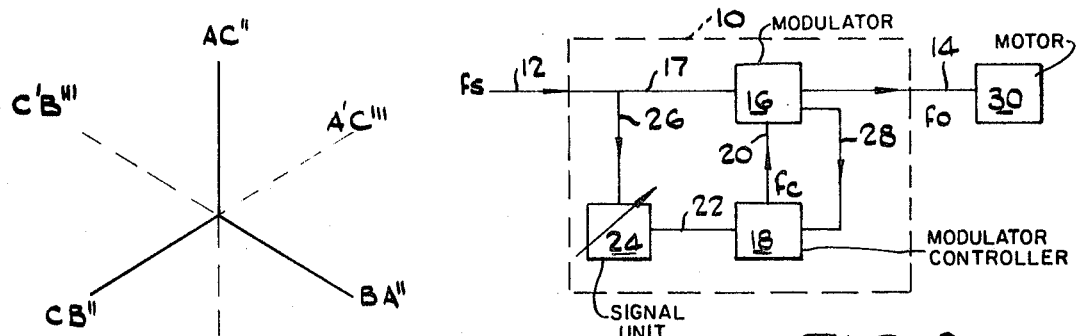
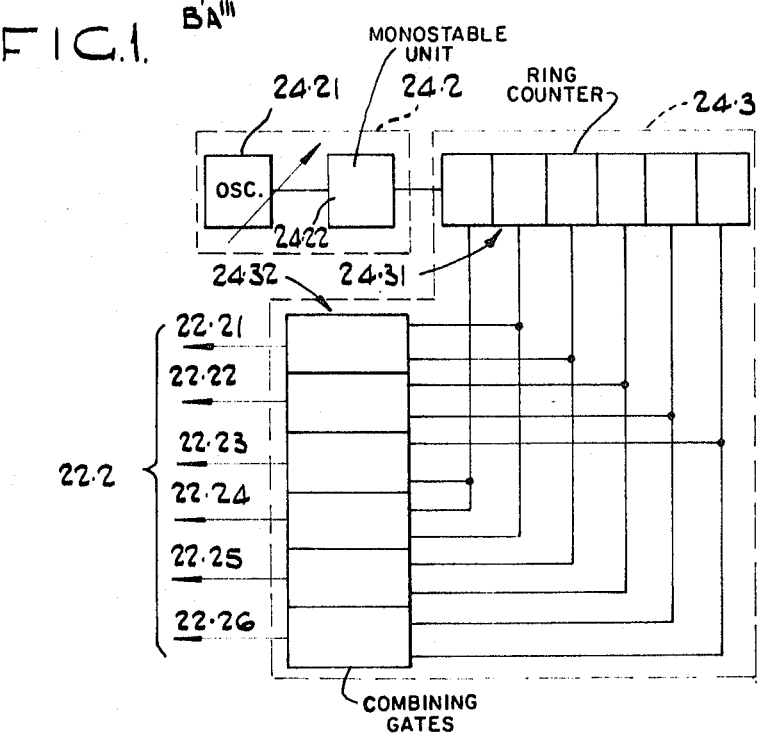
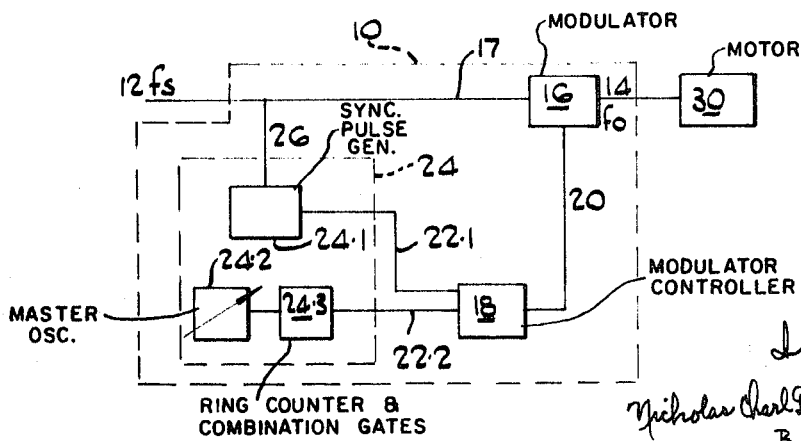

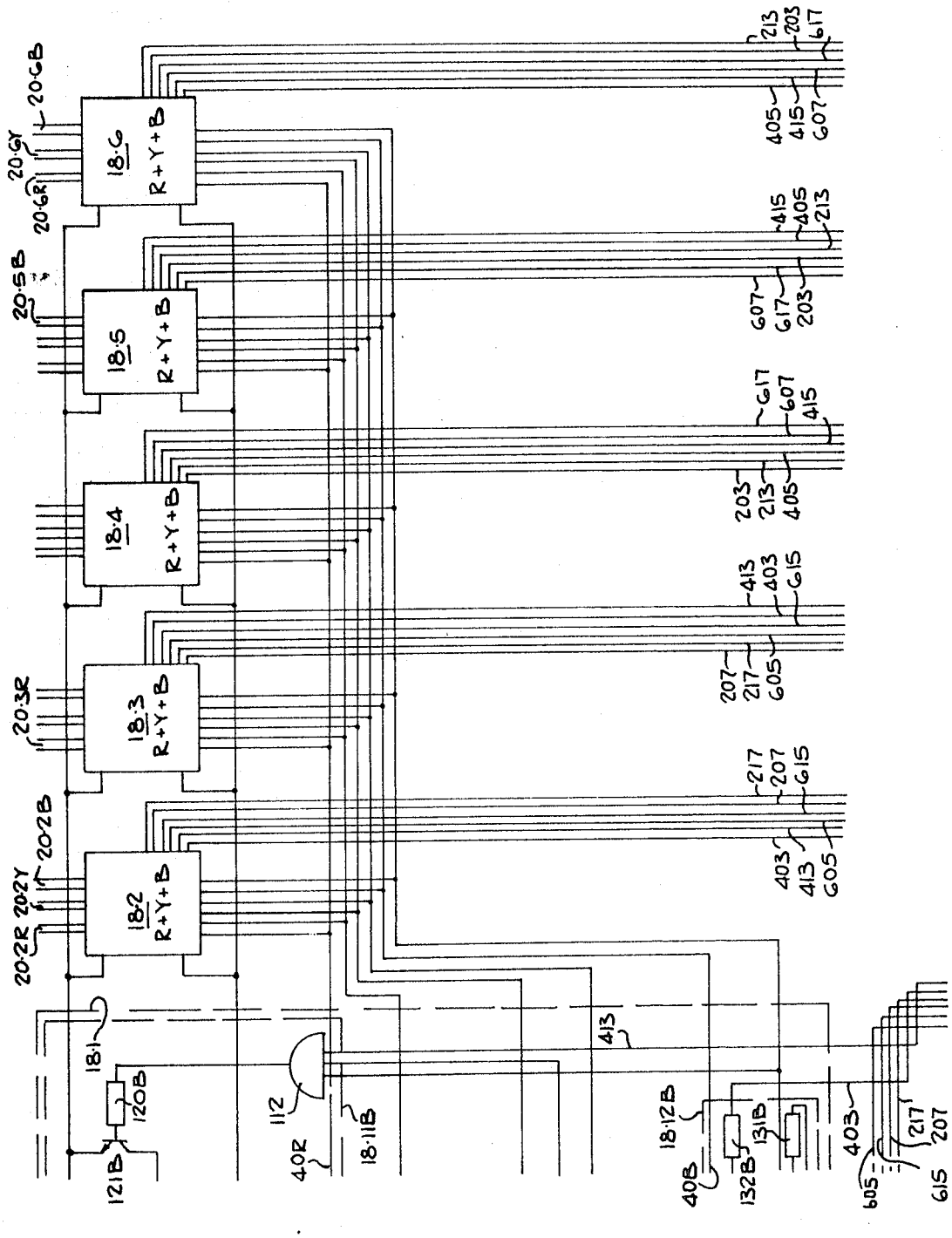

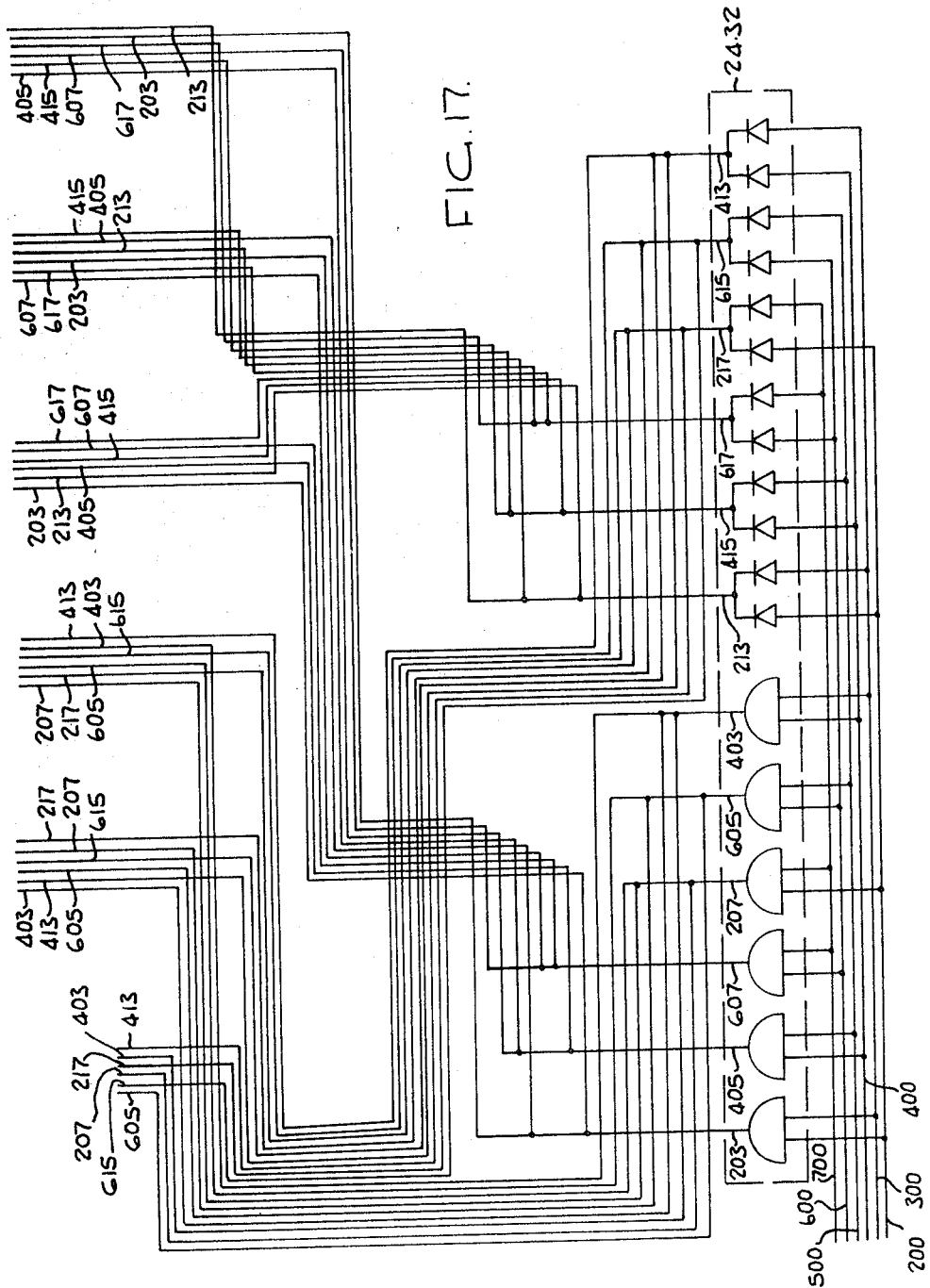

POLYPHASE ALTERNATING CURRENT FREQUENCY VARIATOR FOR INDUCTION AND SYNCHRONOUS TYPE MOTOR

THIS INVENTION relates to a polyphase alternating current frequency variator. It relates in particular to the speed control of alternating current motors. It relates also to the combination of such a variator with an electric motor.

According to the invention, a frequency variator includes
input terminals for connection to a polyphase alternating current supply;
a pair of output terminals for each of a plurality of load phases and adapted for connection to opposing ends of a load phase;
a plurality of power control gates for each output terminal and corresponding in number to the number of supply phases, the output ends of the said power control gates being connected together to the said output terminal, and their various input ends being connected to the input terminals of the various supply phases, the power control gates being adapted to permit power to flow through them in the form of pulses when triggered to do so; and
variable frequency control means to control the rate and sequence of the triggering of the power control gates to permit them to pass power in the form of pulses in cyclic ordered sequence.

The variable frequency control means may be in the form of a free-running generator or master oscillator, or a frequency counter driven by the supply. It may also be in the form of a frequency divider which will produce pulses at multiples and sub-multiples of the supply frequency. Or again it may be obtained by a transducer in a closed loop system which produces pulses.

The frequency control means may be adapted to provide pulses at intervals of at the most 90 electrical degrees. With three-phase alternating current power, the frequency control means may be adapted to provide pulses at intervals of at the most 60 electrical degrees.

The variator may include interlocking means to prevent backfiring by a plurality of power control gates becoming conductive simultaneously. In other words, the interlocking means is adapted to control the firing of each power control gate so that a succeeding power control gate cannot be turned "on" at a time when it can produce a backfire, but will delay the firing until this state is removed.

The power control gates may be in the form of triacs. Alternatively, they may be in the form of silicon controlled rectifiers (SCRs) arranged in opposed back-to-back relationship. The frequency variator may include synchronizing pulse means adapted to prevent triggering of the SCRs out of their proper sequence.

The invention extends also to the combination of an AC electric motor with a frequency variator as described, the terminals of each motor phase winding being connected to the output terminals of the variator for each supply phase.

In general terms, the frequency obtained from the frequency variator is given by the following expression:

$$fo = fs \pm (fc/2m) \quad (1)$$

where
$fo$ = the output frequency out of the frequency variator;
$fs$ = supply frequency;
$fc$ = control frequency;
$m$ = number of phases.

The modulation takes place in fixed steps of $\pi/m$ electrical radians.

When used in combination with a motor, the speed of the motor is given by the following general expression:

$$Ns = fo/p \text{ r.p.m.} \quad (2)$$

where
$Ns$ = speed of the revolving magnetic field (hence speed of the motor);
$fo$ = output frequency out of the frequency variator;
$p$ = number of pole pairs of the motor windings.

It is also possible to introduce fixed angular displacements of the revolving field of the motor relative to the supply or relative to another motor operating from the same supply.

The invention will now be described by way of example, with reference to the accompanying drawings, applied specifically for a three-phase system.

In the drawings:

FIG. 1 shows the principle of time modulation for a three-phase star connected motor;

FIG. 2 shows in block diagram form a frequency variator connected to a motor;

FIG. 5 shows a block diagram of an arrangement differing slightly from that of FIG. 2;

FIG. 6 shows further details of the signal unit of FIG. 5;

Figure 3:
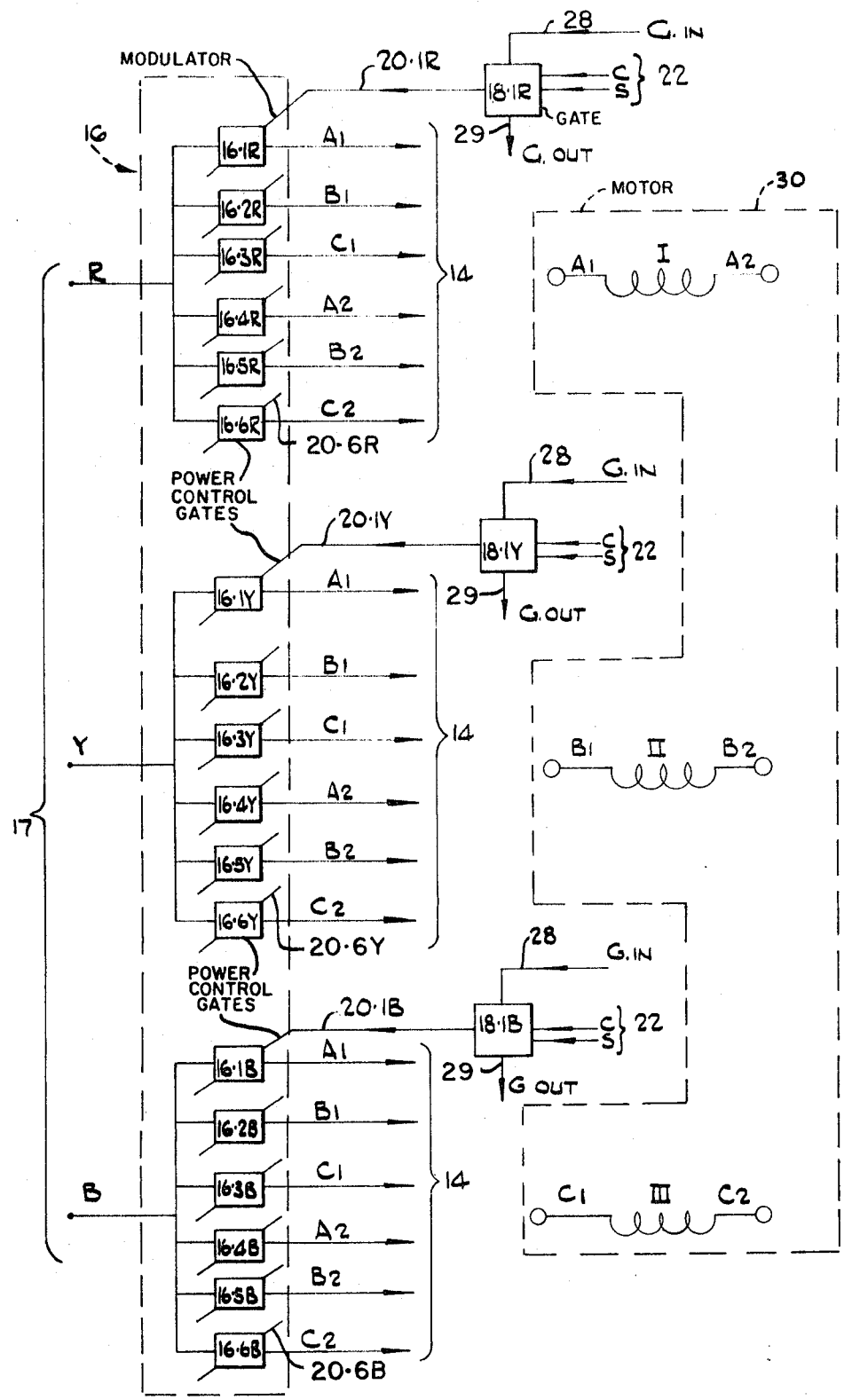
FIG. 3 shows the connection of windings of a motor via the modulator of the variator.

FIGS. 12 to 17 inclusive show detailed circuitry of the invention; and

FIG. 18 shows the relationship of FIGS. 12 to 17 and how they may be assembled to form a complete diagram.

Referring to FIG. 1 of the drawings, the sequential connection of the three phases ABC of a motor is shown for three of the control frequency cycles. The motor is therefore sequentially connected as follows:

ABC A'B'C' A''B''C'' and A'''B'''C'''.

Each step produces $\pi/m$ electrical radians retardation, i.e. 60 electrical degrees for a three-phase system.

Thus the normal revolving field of a motor connected to a three-phase system may be slowed down or speeded up according to the expression (2) by substituting in it the value $m = 3$. The speed is continuously variable over a range from just above standstill to twice the normal synchronous speed.

Referring now to FIG. 2. Reference numeral 10 refers generally to a frequency variator having a polyphase input 12 and a polyphase output 14. The variator includes a modulator 16 connected to the input 12 via connections 17. The modulator 16 is also connected to a modulator controller 18 via connections 20. The controller is connected to the input 12 via connections 22 via variable frequency control means in the form of a signal unit 24, and via connections 26. The modulator and controller are also connected together via an interlock connection 28. In some arrangements the interlock connection 28 may be internal and not external as shown in FIG. 2. A motor 30 is shown connected to the output 14. The modulator controller 18 consists of an electronically controlled switch which is energized sequentially in such a manner that signals are supplied sequentially to the power control gates of the modulator 16. It will be appreciated more fully from the description that follows that the output line 14 represents a plurality of lines interconnecting the motor 30 and the modulator 16. The plurality of lines represented by line 14 serve as both input and return lines for the polyphase current supplied to the motor windings, i.e. both terminals of each winding of the motor 30 are connected via line 14 to the modulator 16.

Refer now to FIG. 3. Reference numeral 16 refers to the modulator 16 which includes a plurality of power control gates in the form of SCRs or TRIACS. The connection 17 comprises three conductors, one for each of three supply phases R, Y and B. Six power control gates 16.1 to 16.6 are connected in parallel to each of the three phases R, Y and B. The six outputs from the power control gates 16.1 to 16.6 for each of the supply phases R, Y and B together constitute the output 14 of the modulator 16. These outputs from the power control gates are connected to the terminals $A_1$, $B_1$, $C_1$ and $A_2$ $B_2$ $C_2$ of the windings I, II, and III of the motor 30, as shown.

Each power control gate 16.1 to 16.6 for R, Y, and B has a gate connection 20.1 to 20.6 for R, Y, and B. These gate connections are connected to the controller 18 circuits 18.1 to 18.6 for R, Y, and B.

In operation, the power control gates 16.1 to 16.6 for R, Y, and B are controlled to turn on and off by the controller 18 circuits 18.1 to 18.6 in the sequence as set out in the following table:

| Output frequency | Red line SCRs or triacs | Yellow line SCRs or triacs | Blue line SCRs or triacs |
|---|---|---|---|
| $\left(f_s - \dfrac{f_o}{6}\right)$ | $C_1A_2$ | $A_1B_2$ | $B_1C_2$ |
| | $A_2B_1$ | $B_2C_1$ | $C_2A_1$ |
| | $B_1C_2$ | $C_1A_2$ | $A_1B_2$ |
| | $C_2A_1$ | $A_2B_1$ | $B_2C_1$ |
| Phase Sequence RYB | $A_1B_2$ | $B_1C_2$ | $C_1A_2$ |
| | $B_2C_1$ | $C_2A_1$ | $A_2B_1$ |
| | $C_1A_2$ | $A_1B_2$ | $B_1C_2$ |
| | $A_2B_1$ | $B_2C_1$ | $C_2A_1$ |
| $\left(f_s + \dfrac{f_o}{6}\right)$ | $B_1C_2$ | $C_1A_2$ | $A_1B_2$ |
| | etc. | etc. | etc. |

The input from the variable frequency control means 24 in the form of pulses, will cause the modulator controller 18 to apply "on" signals to the power control gates 16.1 to 16.6 in the order given in the table. Each input pulse will step the modulator controller 18 either up or down according to the ordered sequence given in the table.

The expression "up or down" refers to the sequence in which the modulator controller 18 is energized, which could either aid the natural phase sequence or oppose it.

Provision will also be made to halt the controller 18 if commutation failure takes place so that the interlock from the SCRs or triacs to the modulator controller circuits 18.1 to 18.6 R Y and B is effective. This interlock controls the gates so that the next SCR or triac cannot be turned on until the preceding one has extinguished, or is in a state for natural commutation.

The interlock has the function of preventing any one power control gate from being switched on at such a time which would cause it to form part of a short-circuit path between any two supply phases. If it is desired to switch on a gate, the interlock system must ensure that any conducting gate either cannot cause a short-circuit, or the interlock must delay the firing of a SCR until the conducting SCR is extinguished.

In order to ensure proper functioning of the frequency variator, it is important that the pulses should follow each other in proper sequence and that they should not overlap otherwise backfires may occur. This may be obtained by controlling the power control gates 16.1 to 16.6 for R, Y and B by the various controlling inputs to the circuits 18.1 to 18.6 for R, Y and B as indicated by G in, G out, C and S in FIG. 3. The operation of the said controlling inputs will be described in more detail hereinafter.

Figure 4:
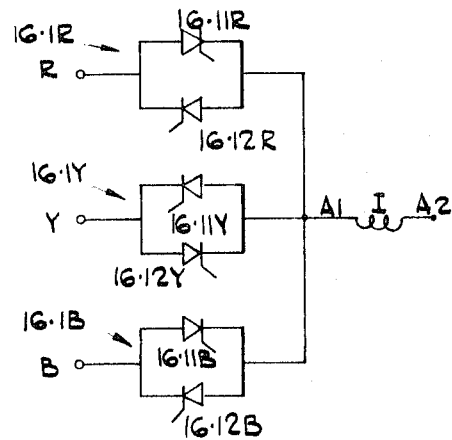
FIG. 4 shows diagrammatically a particular arrangement of power control gates for three-phase operation.

Referring to FIG. 4 of the drawings, it will be noted that three SCR pairs 16.1R, 16.1Y and 16.1B are connected in star in opposed back-to-back relationship to the one end of a winding I for each of the three supply phases R, Y and B (red, yellow and blue).

For the time being, consider only the pair of SCRs 16.11R connected in the red phase to the end A1 of the winding. If SCR 16.11R is "on" or conducts, then current flows from R to A1. If SCR 16.12R is "on" or conducts, then current flows from A1 to R. Assuming now that SCR 16.1R is on and conducting from R to A1. If SCR pair 16.1Y is switched on in only the Y–A1 direction, then no backfire will take place. Similarly, if SCR pair 16.1R conducts in the A1–R direction, then SCR pair 16.1Y may be switched on in the A1–Y direction without resulting in a backfire. Thus, by carefully choosing the SCR, which is switched on, backfires may be avoided. For the winding shown in FIG. 4, the proper sequence of turning the SCRs on, will be from top to bottom, namely 16.11R, 16.12R, 16.11Y, 16.12Y, 16.11B and 16.12B. Backfires will result if 16.11Y is switched on while 16.11R is conducting. Similarly, backfires will result if 16.11B is switched on while 16.11Y is conducting. And similarly, backfires will result if 16.11R is switched on while 16.12B is conducting. This possibility of backfiring is avoided by making use of synchronizing pulses. The method of applying synchronizing pulses, and the apparatus employed for doing so, will be described more fully hereafter. A particular system will first be described generally, and then the method and apparatus of applying the synchronizing pulses to such a system, will be described.

Referring now to FIG. 5 of the drawings, there is shown in block diagram form, a system similar in arrangement to that of FIG. 2. In this arrangement there is no external connection 28, such as shown in FIG. 2, between the modulator 16 and the modulator controller 18. In FIG. 5 the interlocking connection corresponding to 28 of FIG. 2, is provided internally. Furthermore, in FIG. 5 the signal unit 24 is shown to be constituted by three separate parts, namely a synchronous pulse generator 24.1, a master oscillator 24.2, which is adapted to provide a control frequency which is adjustable, and a ring counter and combination gates 24.3. The synchronous pulse generator is operatively connected to the modulator controller 18 via connections 22.1. The master oscillator 24.2 and the ring counter and combination gates, are connected to the modulator controller 18 via connections 22.2.

Referring now to FIG. 6 of the drawings, there are shown further details of the control frequency supply means 24.2 and the ring counter and combining gates 24.3. The control frequency supply means comprises a uni-junction transistor pulse generator or oscillator 24.21, connected to a monostable unit 24.22. The arrow directed transversely through the block 24.2 indicates that the control frequency is variable. The ring counter 24.31 has various channels 1 to 6, connected via appropriate leads to the six combining gates 24.32. The combining gates 24.32 are NOR and OR gates and each is so arranged that an output on the respective lines 22.21 to 22.26 is obtained whenever either of the inputs from the ring counter 24.31 are operative. Thus an output is obtained on the line 22.21 whenever the second or third stages of the ring counter are operative, and an output is obtained on the line 22.22 whenever the fourth or fifth stages are operative, and so on. Each of these combining gates is connected via leads 22.2 to the modulator controller 18. The control pulses are generated by the control frequency supply means, the pulses being distributed via the ring counter and combining gates to the various power control gates. The control pulses are fed via the conductors 22.2 to the modulator controller 18, and thence to the power control gates to ensure that the power control gates are triggered to the conducting condition in their appropriate sequence. The control pulses are arranged to cooperate with the synchronizing pulses which are adapted to prevent triggering of the power control gates, out of their proper sequence. In this arrangement the synchronizing pulses form part of the interlock system by ensuring that SCRs are fired in the correct phase relationship to the supply, and are generated in phase with the supply by means of circuit 24.1, FIG. 13, which rectifies and limits a current supplied from each of the supply phases, to produce a rectangular pulse in phase with each of the supply phases. The combining gates may be any standard two input gates, e.g. AND, OR, NAND, NOR, which are compatible with the system.

Figure 7:
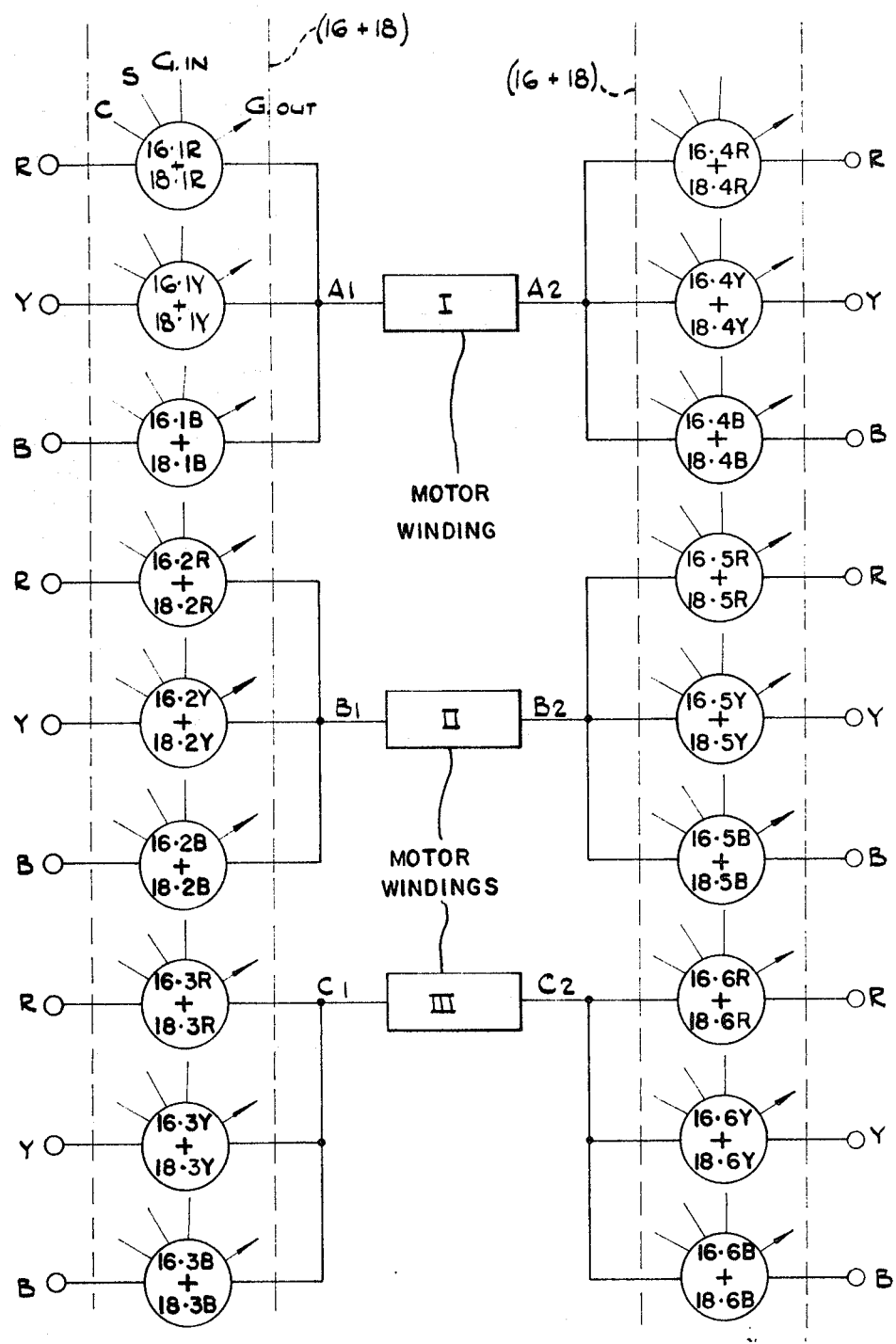
FIG. 7 shows the circuitry of FIG. 3 in a different form, in which the power control gates have been grouped more conveniently.

Please refer now to FIG. 7 of the drawings. In this Figure the various power control gates for the three phases red (R), Yellow (Y), and blue(B) are shown connected to the ends A1, A2; B1, B2; and C1, C2; of the motor phase windings I, II and III respectively.

The arrangement in FIG. 7 is similar to that shown in FIG. 3 and merely emphasizes that in the frequency variator according to the invention, each of the ends A1, A2, B1, B2, C1 and C2 of the motor windings I, II and III are connected to the power control gates 16.1 to 16.6 for R, Y and B. Thus, at a particular instant when say the Red phase is at the peak of its sine wave, current flows from the Red phase input, through the 16.1 R power control gate to the A1 connection of motor winding I, through the motor winding I and via the A2 connection to the 16.4 Y and 16.4 B power control gates to the Yellow and Blue phases. Thus whenever a particular winding, say winding II, is energized, at that instant, two power control gates, e.g. 16.5 R and 16.5 Y connected to the one winding end, e.g. B2, are conductive; and at the same time one power control gate, e.g. 16.2 B connected to the other winding end, e.g. B1, is conductive. The inputs C, S and G in and the output G out have been marked on circuit block 16.1 R and 18.1 R only. They are duplicated on the remaining blocks 16.1 Y and 18.1 Y to 16.6 B and 18.6 B but the marking has been omitted to avoid crowding of the drawing.

Figure 8:
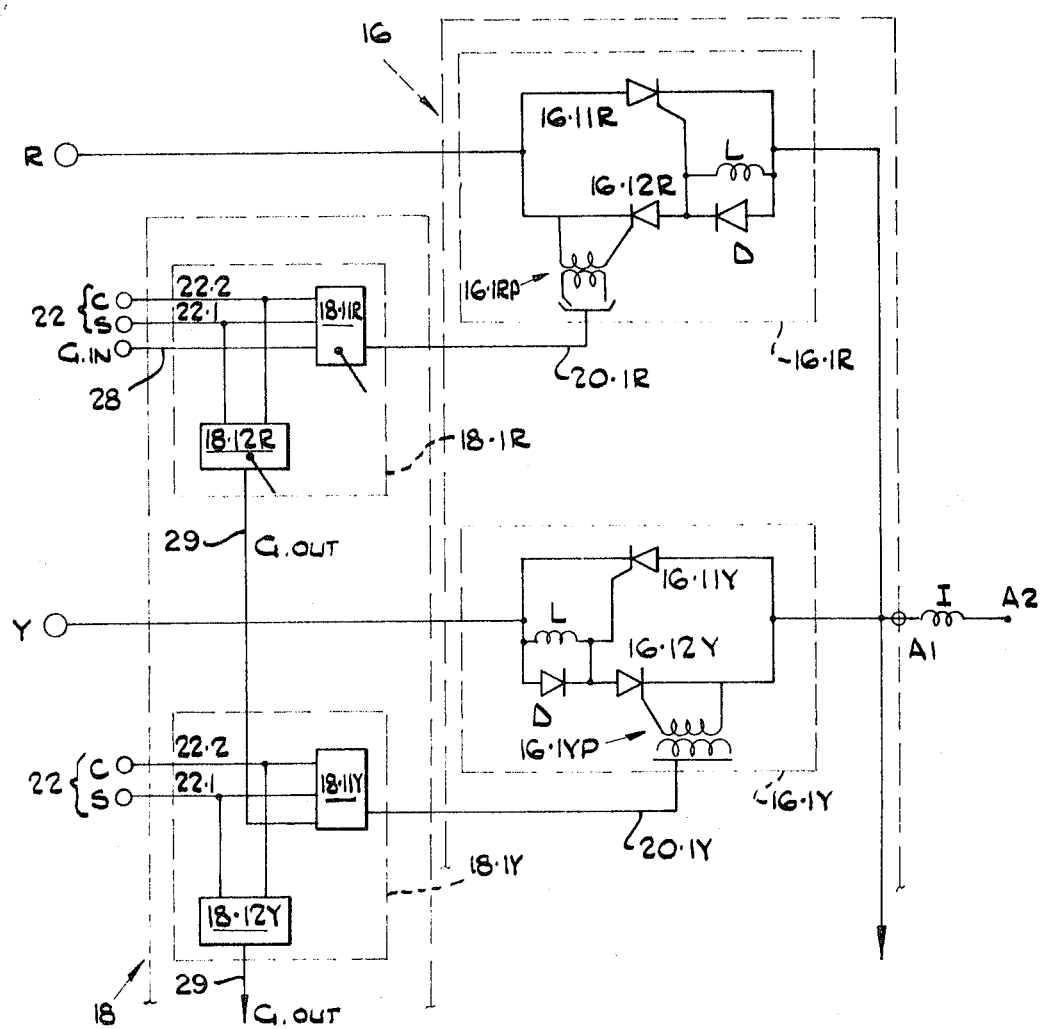
FIG. 8 shows a detail of part of the circuitry of FIG. 7.

Refer now to FIG. 8 of the drawings. In this Figure there is shown a detail of the power control gates for the red and yellow phases connected to the terminal A1 of the machine winding I. Reference numeral 16.1R refers to that portion of the modulator 16 relating to the red phase, and is connected to the A1 terminal of the motor winding I. Reference numeral 18.1R refers to that part of the modulator controller 18 which relates to the red phase for the I winding of the motor. Similar arrangements 16.1Y and 18.1Y are provided for the yellow phase. And likewise similar arrangements (not shown) are provided for the blue phase.

The circuitry 16.1R comprises an SCR 16.11R connected in opposed relationship with SCR 16.12R. It comprises further an inductance L and a diode D, as well as a pulse transformer 16.1RP. This circuitry 16.1R is connected via a conductor 20.1R to the circuitry 18.1R. This circuitry 18.1R comprises a three input gate and trigger pulse generator 18.11R having leads 22.1 and 22.2 leading to the synchronizing pulse supply means and the control frequency pulse supply means. It also has a conductor 28 for connection via G.in to the interlocking means connection of the power control gate from the blue phase (not shown). The circuitry 18.1R further comprises a holding gate 18.12R connected to the connections 22.1 and 22.2. This holding gate 18.12R has an output line 29 (G out) feeding into the three input gate and trigger pulse generator 18.11Y of the yellow phase. The holding gate 18.12Y has an output line 29 (G out) leading to the three input gate and trigger pulse generator (not shown) of the blue phase. The circuitry 16.1Y of the yellow phase is similar to that for the red phase, and its pulse transformer 16.1YP is interconnected with the three input gate and trigger pulse generator 18.11Y of the circuitry 18.1Y by means of the connection 20.1Y.

The C pulses entering on lines 22.2 emanate from lines 22.21 to 22.26 of the ring counter and associated circuitry shown in FIG. 6. The S pulses entering on lines 22.1 emanate from the synchronous pulse generators 24.1 shown in FIG. 5 and shown in more detail in FIG. 13. The G in lines 28 and the G out lines 29 are obtained from the circuitry 18.12 of the preceding control circuit 18.1 to 18.6 in the order of the phases R, Y and B. Thus G in for the Red phase is obtained from G out of the Blue phase, G in for the Yellow phase is obtained from G out of the Red phase, and so on. These pulses ensure that backfires do not occur by making the firing of the power control gates of one phase dependent upon the state of the control circuitry of the preceding phase.

In operation, the SCRs 16.11R, 16.12R, 16.11Y, 16.12Y, and so on, are switched in synchronism by the use of control pulses C and synchronizing pulses S in conjunction with the holding gates 18.12R and 18.12Y and so on. The operation is as follows:

While the SCR 16.12R conducts, a synchronizing pulse is derived from the main supply which prevents 16.11Y from operating even if the C pulse tries to operate it. When the SCR 16.12 R conducts, the C pulse which causes it to conduct, and the S pulse which causes it to be made conducting when the supply polarity is favorable, are applied to the hold gate 18.12 R, which generates the G pulse which inhibits the operation of 16.11 Y as long as the S pulse is applied, even if the C pulse is removed and moves to stage 18.11 Y. In other words the S pulse is applied for as long as 16.12 R conducts and prevents 16.12 Y in conjunction with 16.11 Y short circuiting the supply phases. The operation of the other SCRs is similarly controlled. A result of this synchronized method of switching is that the speed range of the machine for a three phase system is limited to:

$$fs \pm (fs/3).$$

Pulses applied to the pulse transformer 16.1RP switches on SCR 16.12R. Current through the diode D produces a volt drop across it. This causes a current to flow through the inductance L. When the SCR 16.12R goes off, the energy stored in the inductance L is discharged through the gate of SCR 16.11R, thereby causing it to conduct. SCR 16.12 R conducts on the negative half-cycle of the Red phase, and 16.11 R on the positive half-cycle. When 16.12 R is extinguished due to the supply polarity reversal, 16.11 R has the correct applied polarity for it to conduct.

Figure 9:
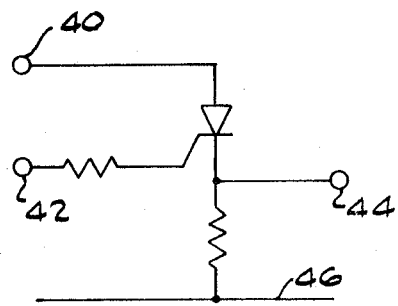
FIG. 9 shows schematically details of a holding gate.

Referring to FIG. 9, there is shown a detail of a holding gate. In operation, the terminal marked 40 is connected to the synchronizing pulse generator 24.1, and the terminal marked 42 is connected to the control frequency pulse generator 24.3. The terminal marked 44 is adapted for connection via conductors 28 to the three input gate and trigger pulse generator 18.11 of an adjacent phase, say, red, i.e. 18.11R. The line 46 is common.

In operation, the synchronizing pulses on line 40 cannot cause the SCR of the holding gate to conduct, until a control or C pulse is applied to the gate of the SCR When this happens, an output is obtained on line 44. If the C pulse is removed before the S pulse, the output on line 44 remains for as long as the S pulse remains, with the result that the operation of the succeeding SCR in the circuit is inhibited for as long as the S pulse remains.

Figure 10:
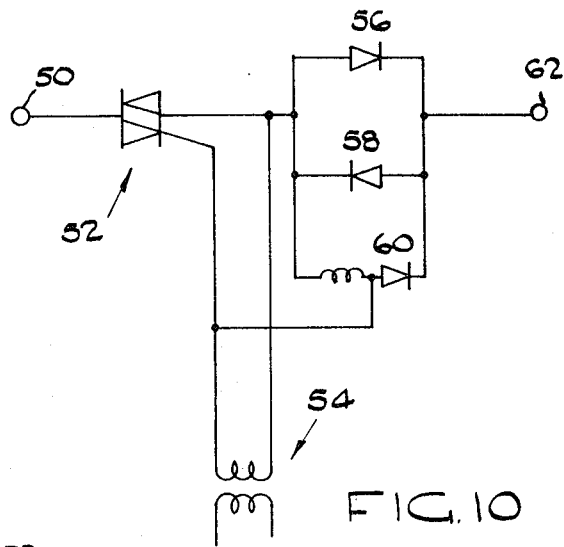
FIG. 10 shows schematically details of an alternative power control gate.

Referring now to FIG. 10 of the drawings, there is shown an alternative power gate embodying a triac 52 instead of a pair of SCRs connected in opposed back-to-back relationship. The terminal marked 50, is adapted for connection to a power supply phase.

This terminal is connected to a triac 52 having a pulse transformer 54 connected to its gate. The triac is connected via opposed parallel connected silicon diodes 56 and 58, and Germanium diode 60 to the terminal 62. This terminal 62 is adapted for connection to one end of a winding of the machine. A plurality of power gates incorporating triacs as described, may be used instead of the back-to-back connected SCRs in the system as shown in FIG. 7.

Figure 11:
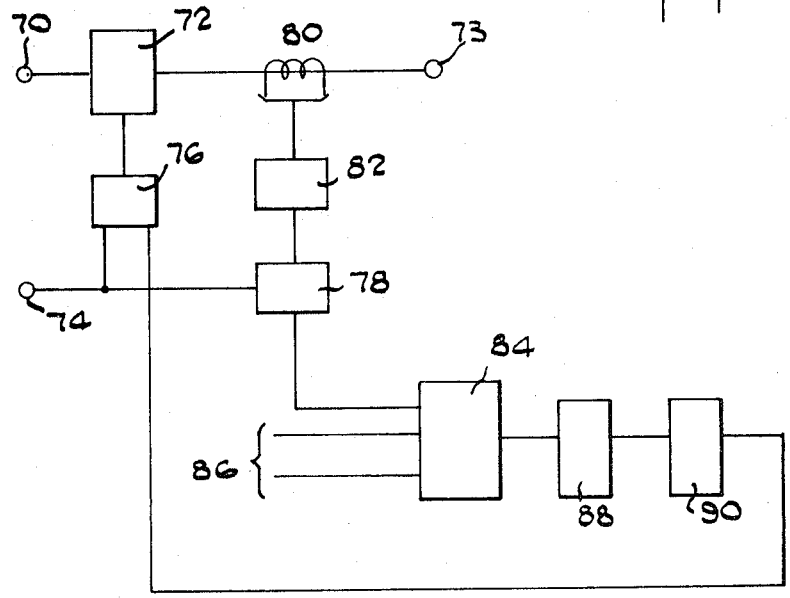
FIG. 11 shows in block diagram form, details of an alternative power gate control system.

Please refer now to FIG. 11 of the drawings. In this figure there is shown an alternative power gate control system which does not require the use of synchronizing pulses. In this arrangement, a power supply phase connection 70 is connected to one end of a power control gate 72 in the form of a pair of back-to-back SCRs or a triac. The other end of the power control gate is connected to a terminal 73 which is adapted for connection to one end of a load winding. A control pulse is fed in at terminal 74 to a two input gate with trigger generator 76, and also to an inhibit gate 78. The inhibit gate is itself fed from a current transformer 80 via an amplifier or limiter 82. The output from the inhibit gate is fed into a three input gate 84, in parallel with the inputs 86 from the other two phases. The three input gate 84 is interconnected with the two input gate 76 via an amplifier 88 and a rectifier 90.

Referring now to FIGS. 12 to 18, the function of the synchronizing pulse generators 24.1 (FIG. 13) is to provide the pulses that ensure that the SCRs (16.12 R, 16.11 Y and 16.12 B) are switched in phase with the mains supply. Diode 100 R, resistors 101 R 102R and zener diode 103 R provide square waves, in phase with the mains, at line 41 R. Transistors 106 R, in conjunction with resistors 104 R and 105 R invert these pulses, which then appear on line 40 R. The pulses on line 40 R are such that line 40 R is at zero potential when the phase is positive. A similar situation exists at lines 40 Y, 40 B, 41 Y and 41 B with respect to the yellow and blue phases.

Figure 12:
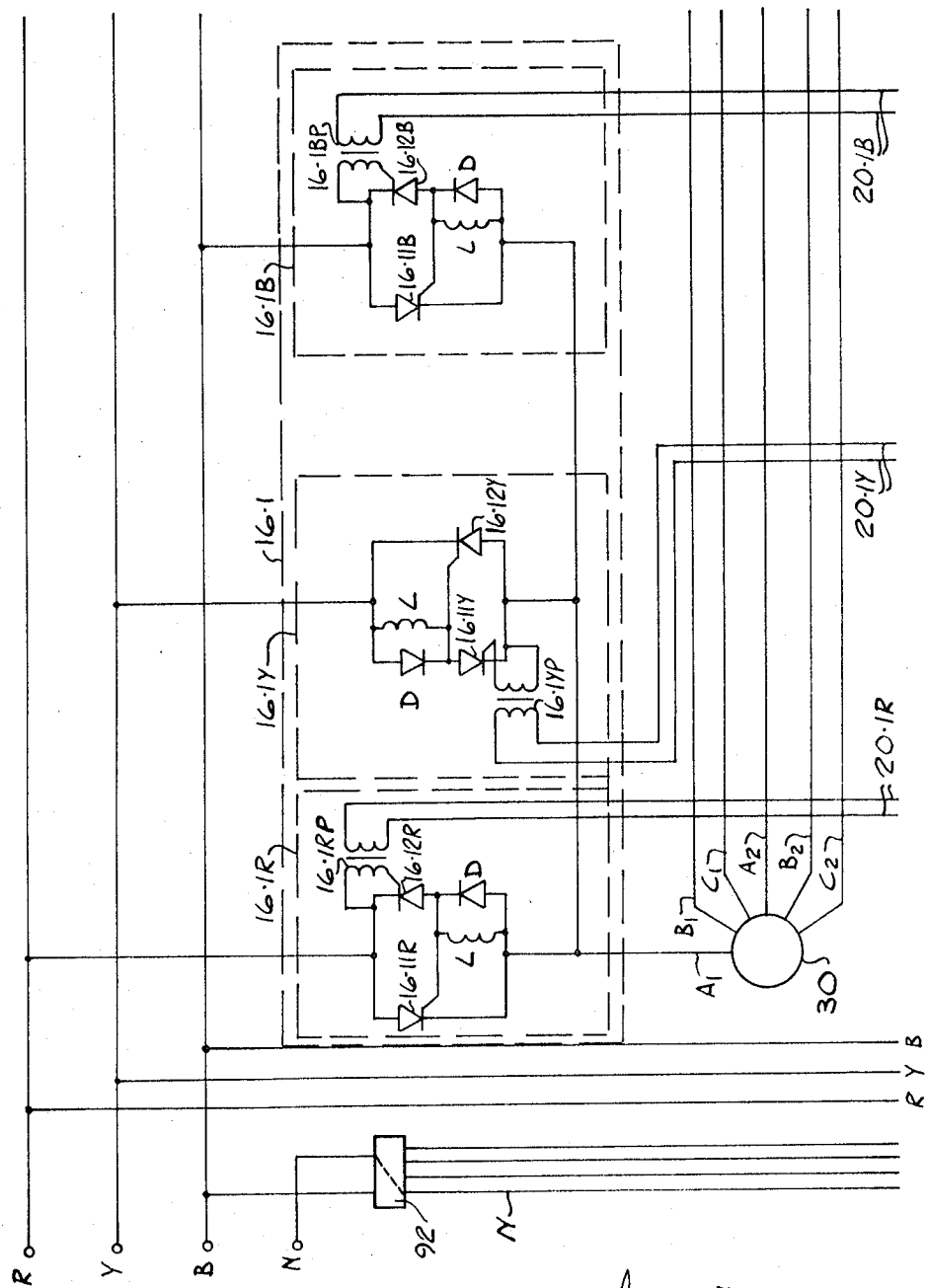
Figure 14:
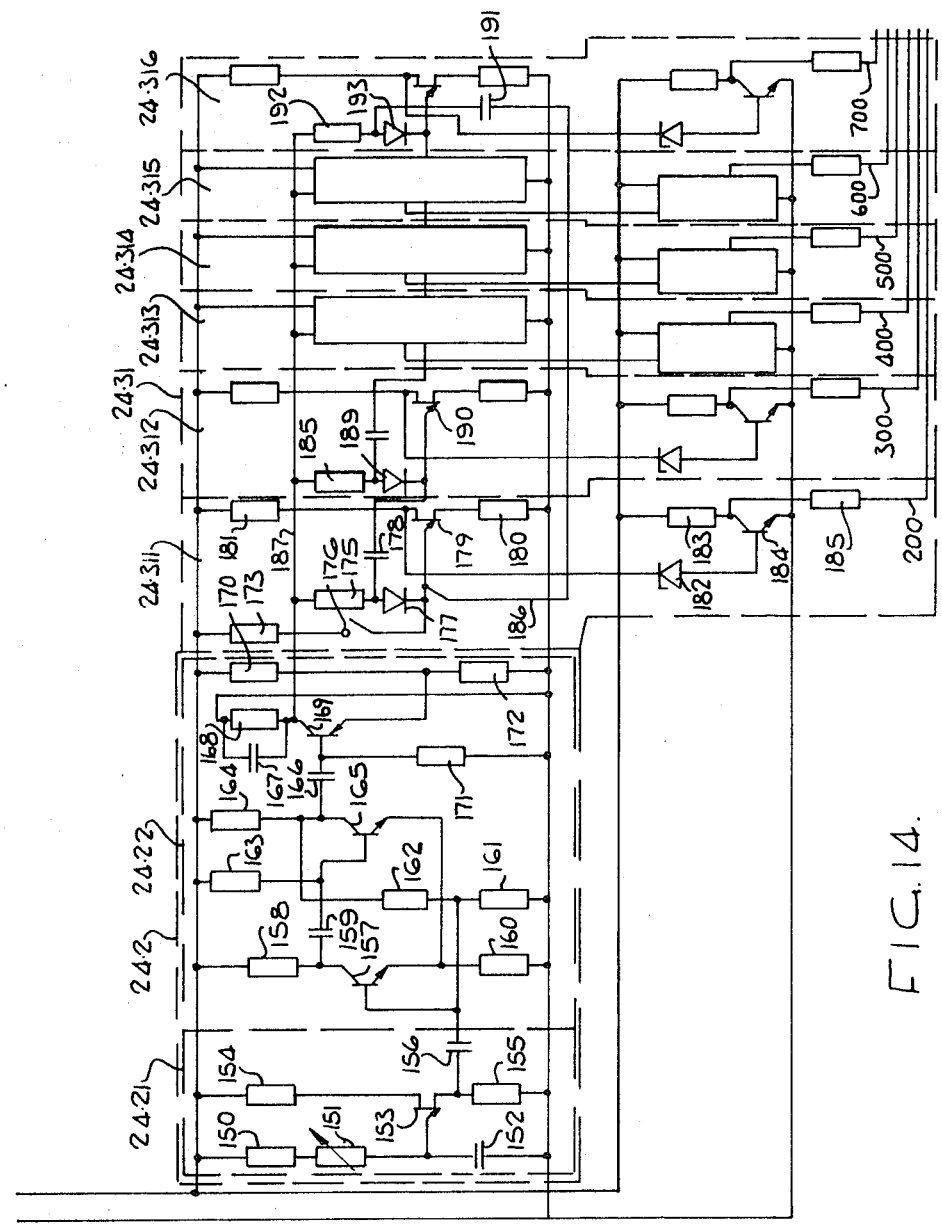
Figure 15:
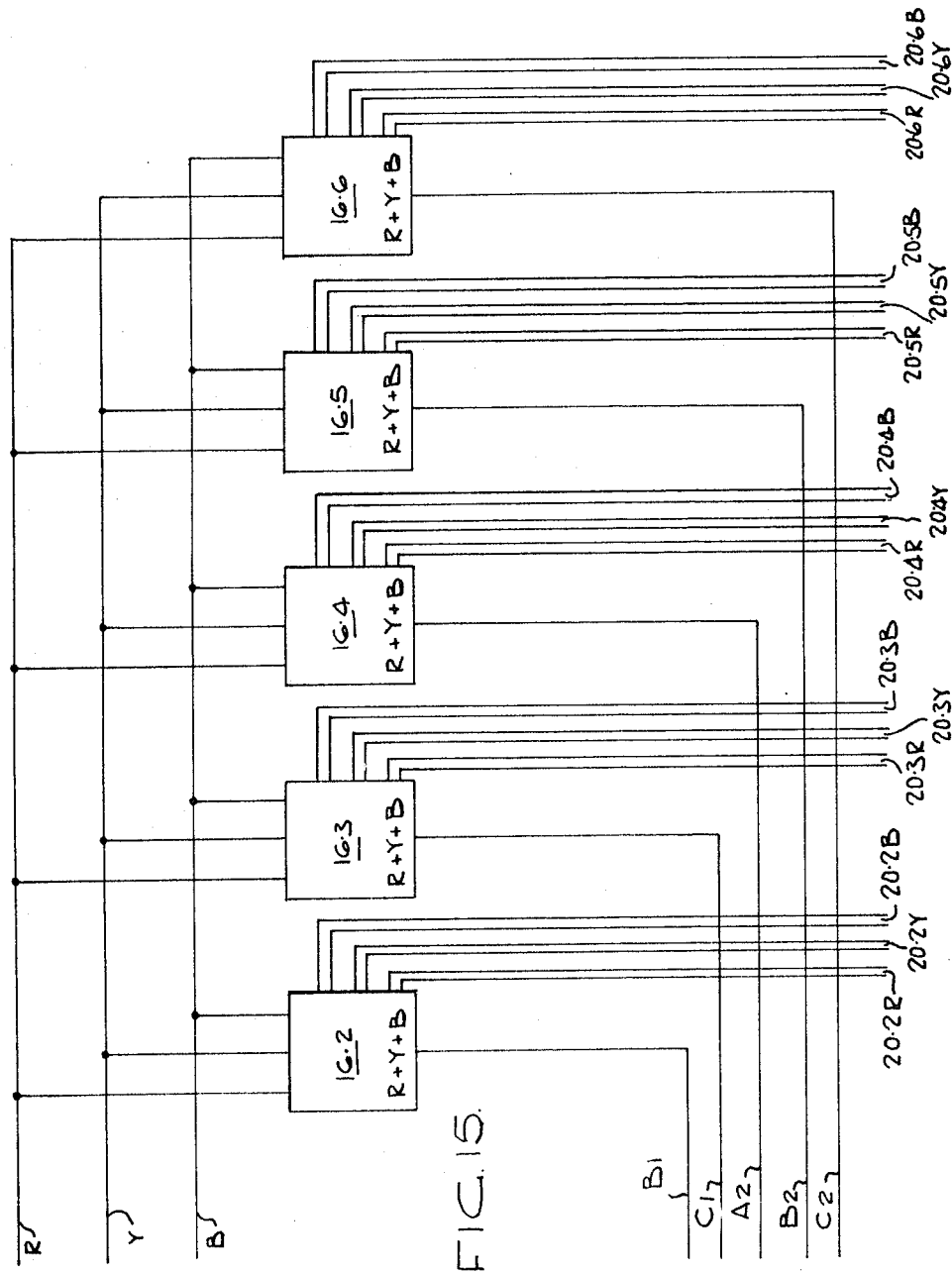

Consider now the pulse generator 24.21 (FIG. 14). The capacitor 152 is charged via resistors 150 and variable resistor 151 from the D.C. power supply 92 (FIG. 12). The potential appearing across capacitor 152 is applied to the emitter of unijunction transitor 153 and when this potential reaches an appropriate value, the unijunction transistor conducts through resistors 154 and 155 and produces a pulse through capacitor 156. When capacitor 152 has discharged, the process is repeated. The frequency of pulsation is determined by the setting of variable resistor 151, which thus controls the frequency of the C pulses on line 22.2 and eventually the speed of the motor 30. The pulses appearing at capacitor 156 are applied to monostable multivibrator 24.22, comprising resistors 158, 160, 161, 162, 163 and 164, capacitors 159 and 166 and transistors 157 and 165. The action of the monostable multivibrator is to extend the pulse produced by oscillator 24.21 to sufficient duration to operate the ring counter 24.31, after amplification and inversion by the amplifier comprising transistor 169, resistors 168, 170, 171, and 172, and capacitor 167.

The ring counter 24.31 comprises 6 stages 24.311 to 24.316, each consisting of the same components as 24.311, except for the provision of the switch 176 in stage 24.311, which permits the counter to be reset. Feedback is provided over the line 186 from the sixth stage to the first stage. The action of the ring counter is that pulses applied on line 186 cause the unijunction transistors (e.g. 179 in stage 24.311) to switch on and off in succession. Assume first of all that switch 176 is operated and released. Unijunction transistor 179 of the first stage is switched on through resistor 173 and kept on through resistor 175 and diode 177. The other unijunction transistors are all off. Thus capacitor 178 charges through resistor 188 and diode 189, in conjunction with the emitter voltage of unijunction transistor 190 of the second stage. Also, capacitor 191 of the sixth stage has charged through resistor 192, but to opposite polarity to capacitor 178. When transistor 169 cuts off due to the pulse arriving from the pulse generator 24.21, the emitter potential of all unijunction transistors is removed and all cut off. Capacitor 191 discharges through resistors 192 and 175, and diode 177. Because of diode 189, capacitor 178 cannot discharge. When transistor 169 is switched on the emitter potential is restored. The charge on capacitor 178 is added in series with this potential and unijunction transistor 190 of the second stage only switches on. Thus the unijunction transistors are switched on successively. The outputs from the ring counter stages are amplified and inverted by six amplifiers, each identical. For example, the amplifier for the first stage 24.311 comprises zener diode 182, resistors 183 and 185 and transistor 184. The outputs from the stages of the ring counter 24.31 are combined by NOR and OR gates 24.32 (FIG. 17). These ring counter outputs are identified by lines 200, 300, 400, 500, 600 and 700. The combined outputs from the NOR gates (FIG. 17) are 203, 405, 607, 207, 605, and 403, and the outputs from the OR gates are 213, 415, 617, 217, 615 and 413. These combined pulses are used to control the circuits 18.1 to 18.6. It will now be appreciated that the outputs 22.21 to 22.26 (FIG. 6) each comprise two outputs. The numerals used in FIG. 6 correspond to the numerals used in FIGS. 14, 16 and 17 as follows:

| Figure 6 | Figures 14, 16 & 17 |
|---|---|
| 22.21 | 403 & 413 |
| 22.22 | 605 & 615 |
| 22.23 | 207 & 217 |
| 22.24 | 203 & 213 |
| 22.25 | 405 & 415 |
| 22.26 | 607 & 617 |

Figure 13:
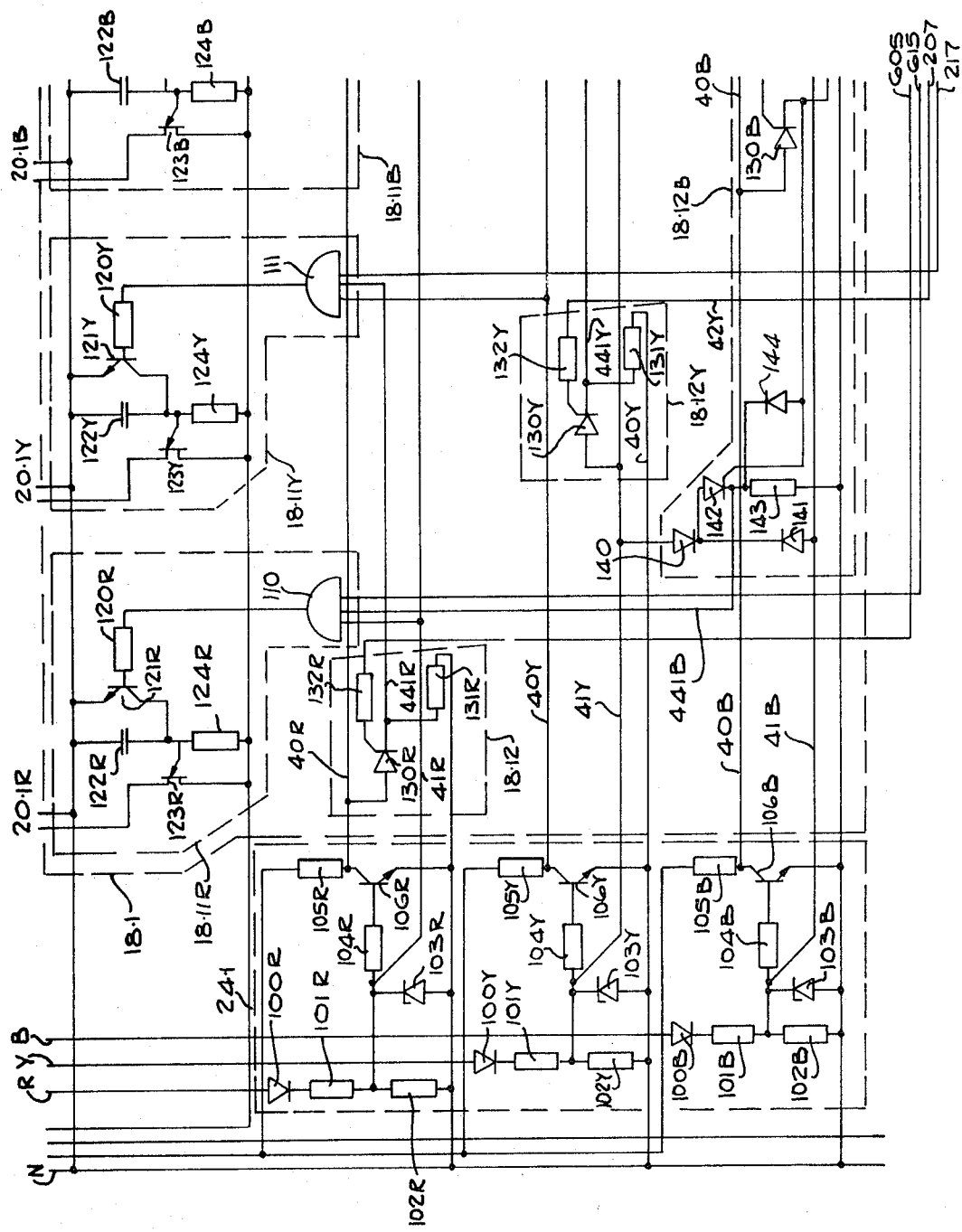

Refer now again to the control circuit 18.1 shown in FIG. 13. If the ring counter 24.31 is on position 500, i.e. the fourth stage is operative, then an output appears on line 605, and zero potential on line 615. If the red phase now goes negative, an output appears on line 40 R. Thus, via resistor 132 R, the line 605 fires SCR 130 R, which conducts between line 40 R through resistor 131 R to neutral of the mains supply. Because SCR 130 R conducts, a potential is applied to OR gate III, and thus the output of the OR gate III goes to some positive potential. On OR gate 110 we have applied zero potential from line 41 R, zero potential from line 615, and, if zero potential is obtained from hold gate 18.12 B (i.e. SCRs 16.11 B and 16.12 B both off), then no output appears from OR gate 110, and then transistor 121 R switches off, and the pulse generator of circuit 18.11 R, comprising resistor 124 R, capacitor 122 R and unijunction transistor 123 R, commences oscillation. The output from unijunction transistor 123 R is coupled to SCR 16.12 R (FIG. 12) via line 20.1 R and transformer 16.18 R, causing SCR 16.12 R to conduct.

When the potential on the red phase goes positive, SCR 16.12 R goes off, the energy stored in inductor L is discharged through the gate of SCR 16.11 R, which conducts. As long as the ring counter stays in a fixed position, this situation continues.

Should the ring counter change state, and an attempt is made to switch on SCR 16.11 Y while 16.12 R is conducting, then a short-circuit would be placed across the power supply lines. The hold gates 18.12 R etc. are to avoid this. Assume while 16.12 R is conducting, the ring counter changes to a state where line 207 and 217 are appropriately energized. As long as the potential on line 40 R is high, OR gate III has a high output and pulse generator 18.11 Y is inhibited. Even if the signal on line 605 is removed, SCR 130 R will continue to conduct until the potential on line 40 R goes to zero. Thus, SCR 16.11 Y is kept off until SCR 16.12 R goes off. If 16.11 Y fires while 16.12 R is conducting, no short-circuit can occur.

When the change over from yellow phase to blue phase takes place, hold gate 18.12 Y operates in similar fashion. However, when the change from blue phase back to red phase takes place, then both SCRs 16.11 B and 16.12 B must be off to avoid short-circuits. This condition is achieved by additional SCR 142, resistor 143 and diodes 140 144 and 141 of hold circuit 18.12 B. SCR 142 is connected to line 41 B through diode 141 and to line 41 Y through diode 140. Now when the line 40 B is high, a positive potential is applied to the gate of SCR 142, if the SCR 16.12 B has obtained a control signal (via lines 413 and 403). When line 41 Y goes positive, which is 120 electrical degrees after 40 B goes positive, SCR 142 will conduct. Thus, when the change over of potentials from 40 B to 41 B occurs, (which has a short delay), SCR 142 does not go out and continues to inhibit the operation of pulse generator 18.11 R. The operation of this circuitry also applies to circuits 16.2 through 16.6.

This method and apparatus permits the variation of the speed of standard induction and synchronous motors in open and closed loop systems. It also permits the fixed positional changing between shafts of a whole group of synchronous motors which are interrelated, e.g. in a whole automated system. This change can be produced continuously or in fixed amounts, each pulse from the signal unit advancing or retarding the rotor by 60 electrical degrees.

It also permits the use in combination of speed variation and fixed positional changes between shafts.

I claim:

1. A frequency variator which includes input terminals adapted for connection to a polyphase alternating current supply and corresponding in number to the number of supply phases;

a pair of output terminals for each of a plurality of load phases and adapted for connection to opposing ends of a load phase;

a plurality of power control gates for each output terminal and corresponding in number to the number of supply phases, the output ends of the said power control gates for each load phase being connected to the respective output terminals, the input ends of the said power control gates being connected to the respective input terminals, and the said power control gates being adapted to permit alternating current power to flow through them in the form of pulses when triggered to do so; and control means adapted to control the rate and sequence of the triggering of the power control gates to permit them to pass alternating current power in the form of pulses in cyclic ordered sequence from any input terminal to any output terminal, the control means including:
  a. a variable frequency means for varying the rate of triggering of the power control gates; and
  b. synchronizing pulse means for preventing backfiring between supply phases via power control gates connected to the same output terminal, by controlling the triggering of such power control gates and thereby preventing them from becoming conductive simultaneously.

2. A method of varying the speed of polyphase alternating current induction and synchronous type motors having a plurality of phase windings and energized from a polyphase alternating current power supply which includes sequentially switching alternating current power pulses in cyclic ordered sequence from every supply phase to both ends of each phase winding, varying the frequency of said pulses to the said ends of the phase windings to set the speed of said motor at a desired rate of rotation, and applying natural commutation to said pluses switched to said phase windings in order to prevent backfiring between phases so that a pulse from a particular supply phase is not applied to any one phase winding until a pulse from a different supply phase applied to that phase winding has terminated.

3. A frequency variator as claimed in claim 1, which further includes a plurality of triggering gates adapted to combine the outputs of the variable frequency means and the synchronizing pulse means, the outputs of the triggering gates being applied to control the triggering of the power control gates.

4. A frequency variator as claimed in claim 3, which includes a holding gate associated with each supply phase, each holding gate having an interlocking output applied to the triggering gate of a succeeding supply phase and being adapted to prevent the power control gates of a particular supply phase being triggered before the power control gates of a preceding supply phase have returned to their untriggered state.

* * * * *